United States Patent
Cazuc et al.

(10) Patent No.: US 12,188,432 B2
(45) Date of Patent: Jan. 7, 2025

(54) DEVICE FOR ATTACHING A CONNECTING ROD SMALL END FOR A THRUST REVERSAL CASCADE FLAP

(71) Applicant: SAFRAN NACELLES, Gonfreville-l'Orcher (FR)

(72) Inventors: Xavier Cazuc, Moissy-Cramayel (FR); Jean-Phillipe Joret, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 205 days.

(21) Appl. No.: 17/797,528

(22) PCT Filed: Feb. 5, 2021

(86) PCT No.: PCT/EP2021/052868
§ 371 (c)(1),
(2) Date: Aug. 4, 2022

(87) PCT Pub. No.: WO2021/156477
PCT Pub. Date: Aug. 12, 2021

(65) Prior Publication Data
US 2023/0059782 A1     Feb. 23, 2023

(30) Foreign Application Priority Data
Feb. 6, 2020 (FR) ........................ 2001198

(51) Int. Cl.
*F02K 1/72* (2006.01)
(52) U.S. Cl.
CPC ............ *F02K 1/72* (2013.01); *F05D 2260/31* (2013.01); *F05D 2260/36* (2013.01); *F05D 2260/38* (2013.01); *F05D 2260/50* (2013.01)

(58) Field of Classification Search
CPC ..... F02K 1/70; F02K 1/72; F02K 1/80; F05D 2260/31; F05D 2260/36; F05D 2260/50
See application file for complete search history.

(56) References Cited

U.S. PATENT DOCUMENTS

| 4,605,186 A | 8/1986 | Fernz |
| 2017/0101962 A1 | 4/2017 | Kelford et al. |

(Continued)

FOREIGN PATENT DOCUMENTS

| EP | 3 293 388 A1 | 3/2018 |
| FR | 2 958 978 A1 | 10/2011 |

OTHER PUBLICATIONS

English translation of Written Opinion mailed Apr. 6, 2021, issued in corresponding International Application No. PCT/EP2021/052868, filed Feb. 5, 2021, 7 pages.

(Continued)

*Primary Examiner* — Andrew H Nguyen
(74) *Attorney, Agent, or Firm* — CHRISTENSEN O'CONNOR JOHNSON KINDNESS PLLC (57) ABSTRACT

A device for attaching a connecting rod small end for a thrust reversal cascade flap onto a fixed internal structure of a turbojet engine nacelle includes a fitting configured to be fixed to the internal structure and a connection interface forming a joint between the connecting rod small end and the fitting. The device further includes a removable fork configured to cooperate with the connection interface, wherein the fork and the connection interface are arranged inside the fitting.

13 Claims, 6 Drawing Sheets

(56) References Cited

U.S. PATENT DOCUMENTS

2017/0298871 A1* 10/2017 Sawyers-Abbott ....... F02K 1/80
2018/0065754 A1*  3/2018 Sawyers-Abbott ... F16C 11/045
2018/0066607 A1*  3/2018 Sawyers-Abbott ....... F02K 1/72

OTHER PUBLICATIONS

International Preliminary Report on Patentability mailed Jul. 28, 2022, issued in corresponding International Application No. PCT/EP2021/052868, filed Feb. 5, 2021, 6 pages.
International Search Report mailed Apr. 6, 2021, issued in corresponding International Application No. PCT/EP2021/052868, filed Feb. 5, 2021, 6 pages.
Written Opinion mailed Apr. 6, 2021, issued in corresponding International Application No. PCT/EP2021/052868, filed Feb. 5, 2021, 5 pages.

* cited by examiner

DEVICE FOR ATTACHING A CONNECTING ROD SMALL END FOR A THRUST REVERSAL CASCADE FLAP

FIELD OF THE DISCLOSURE

The present disclosure relates to cascade thrust reversers and relates more particularly to the attachment of the connecting rod small ends for the thrust reversal flaps.

BACKGROUND

An aircraft generally comprises a powertrain formed by a plurality of turbojet engines providing the thrust necessary for its movement.

Each turbojet engine is housed in a nacelle which performs various functions, such as for example reverse thrust which is obtained using a thrust reverser whose role, when an aircraft lands, is to reduce the braking distance of the latter by redirecting forward at least a portion of the thrust generated by the turbojet, thus creating a counter-thrust contributing to the braking of the aircraft.

The turbojet engine generally comprises an air inlet and a fan which ensure the compression of the air and divides it into primary and secondary airflows.

It also comprises a primary flow path wherein the primary air flow circulates through a compressor, a combustion chamber and a turbine, and a secondary flow path.

More specifically, the thrust reverser obstructs a downstream portion of the secondary flow path by means of a solid obstacle in order to redirect the flow of secondary air forwards.

Modern aircraft are generally equipped with cascade reversers including a plurality of locking flaps hingedly mounted on a movable cowl sliding along rails so as to uncover and or conceal cascades.

The cascades are able to redirect the secondary air flow upstream of the nacelle when the aircraft is braking.

The movable cowl is longitudinally movable in translation between a closed position, commonly called "direct jet" wherein the cascades are concealed inside the cowl and an open position or "reverse jet" wherein the cascades perform their deflection function because of their exposure to the secondary flow path.

More particularly, the device comprises a plurality of connecting rods whose function is to connect the locking flaps to an inner structure of the nacelle commonly called IFS (for "Inner Fixed Structure").

In other words, when the thrust reverser operates in direct jet, the locking flaps are maintained in a retracted position but when it operates in reverse jet, the flaps are deployed in such a way as to deflect the secondary air flow.

In order to reduce the loss of aerodynamic performance at the interface between each of the connecting rods of the flap and their attachment point on the fixed structure of the thrust reverser, it is generally known to use an aerodynamic fairing.

Nevertheless, the fairing has certain disadvantages related in particular to its attachment.

One of the known configurations is to attach a fairing onto the structure of the nacelle, enveloping the connecting rod small end. This arrangement increases the space requirement of the fairing to the detriment of its aerodynamics.

Another solution is to integrate the fairing into the fitting of the connecting rod small end, which allows to optimise the size. This solution is however aerodynamically less efficient.

In addition, the forces exerted on the fairing, generally made of plastic, can damage it or even separate it from the structure on which the fairing is fixed.

The challenge is therefore to dispense with the fairing while improving the aerodynamic flow and maintaining the arrangement at the connecting rod small end.

SUMMARY

In view of the foregoing, the object of the disclosure is a device for attaching a connecting rod small end of a thrust reversal cascade flap onto an inner fixed structure of a turbojet engine nacelle, comprising a fitting that is suitable for being fixed to the inner structure and a connection interface forming a joint between the connecting rod small end and the fitting.

The device includes a removable locking means suitable for cooperating with the connection interface so as to rotationally lock it, the locking means and the connection interface being arranged inside the fitting.

"Arranged inside the fitting" means that no boss is formed at the casing of the fitting by the volume of the connection interface and the fork. It is also understood that the fork and the connection interface are circumscribed in the inner space delimited by the sides facing the fitting.

Thanks to the absence of a boss on the profile of the fitting, the aerodynamic flow is improved.

However, in order to maintain a constant clearance between the connection interface and the fitting, it is advantageous to use a mechanical part in the shape of a fork as a means for locking the connection interface.

As the fork is located inside the fitting, this configuration further improves the aerodynamic performance while ensuring good stability at the connecting rod small end and therefore preserving the correct operation of the thrust reverser.

Moreover, such locking means have a small thickness, which allows to limit the thickness of the fitting and therefore to limit the impact on the performance of the engine due to the fact that they are housed inside the volume delimited by the fitting.

Advantageously, the connection interface comprises a first screw and a first nut configured to cooperate with the first screw. It is therefore the screw that is used as the pivot axis for the connecting rod small end.

It should be noted that the nut is advantageously of rectangular shape, which allows to torque the first screw.

Preferably, the first screw comprises at least one flat surface or at least one shoulder in contact with its base, the removable locking means comprising a fork including at least one tooth extending along a transverse axis perpendicular to the longitudinal axis of the first screw, the at least one tooth cooperating with the at least one flat surface or shoulder.

The shoulder or the flat surface allows to rotationally lock the first screw when the fork surrounds it by the at least one tooth.

It should be noted that torquing allows more or less ¼ turn.

The first screw can comprise a plurality of shoulders which can form, for example, a shoulder of hexagonal shape. Similarly, the first screw may include alternatively to the at least one shoulder, at least one flat surface or a plurality of flat surfaces, for example of hexagonal shape.

As for the junction, it may comprise, for example, two sides preferably forming an obtuse angle.

Alternatively, the first screw comprises at least one housing extending perpendicularly to the longitudinal axis of the first screw, the removable locking means including a fork comprising a rod configured to be inserted into the housing.

In other words, by inserting the single tooth of the fork into the housing, the first screw is rotationally locked.

The number of housings within the first screw is chosen according to the tightening torque between the first nut and the first screw.

Preferably, the device includes holding means arranged inside the fitting and configured to hold the locking means in position.

When the cowl translates from the closed position to the open position, the fork is subjected to forces, in particular shear forces, suitable for separating it from the fitting of the connecting rod small end, which could result in the loosening of the first screw leading to weakening the mechanical strength of the device for attaching the connecting rod small end.

It is therefore advantageous to provide means for holding the fork in position in order to guarantee the stability of the arrangement of the mechanical parts of the device.

Advantageously, the holding means comprise a spring pin surrounding a support area integral with the fitting and passing through the locking means.

According to another variant, the holding means include at least one rivet located on the locking means.

According to another variant, the holding means comprise a second screw suitable for cooperating with a second nut.

It should be noted that due to the absence of relative movement between the fork and the fitting, torque tightening is sufficient here.

Preferably, the holding means comprise a lockwire arranged between the second nut and the locking means, suitable for holding the second screw in position.

Advantageously, the holding means are at a distance comprised between 12 mm and 200 mm from the connection interface.

Preferably, the connecting rod small end comprises at least two projections perpendicular to the longitudinal axis of the connecting rod, in contact with the locking means.

In order to reduce the angular oscillations of the connecting rod, consequences of aerodynamic loading, it is advantageous to integrate the at least two projections in the connecting rod small end, thus placing them in contact with the fork.

This also has the advantage of reducing the dimensions of other mechanical parts arranged inside the fitting and which initially have the function of limiting the angular travel of the connecting rod. The width of the fitting is reduced, which is characterised by a reduction in the mass of the assembly and a greater aerodynamic performance.

According to another aspect, provision is made of a cascade thrust reverser comprising a device for attaching at least one connecting rod small end for the thrust reversal flap as defined above.

Another object of the disclosure is a nacelle for an aircraft turbojet engine comprising a cascade thrust reverser as defined above.

DESCRIPTION OF THE DRAWINGS

Other purposes, features and advantages of the disclosure will appear upon reading the following description, given only by way of non-limiting example, and made with reference to the indexed drawings on which.

DETAILED DESCRIPTION

Figure 1:
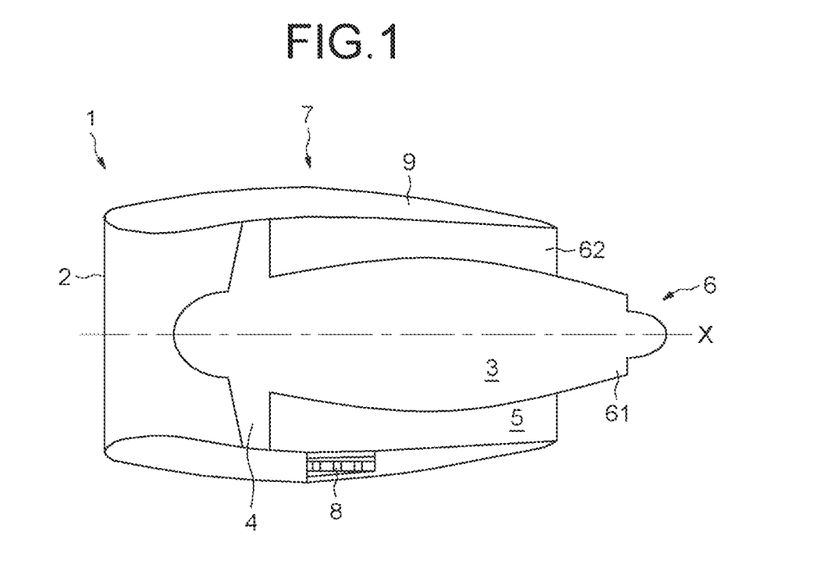
FIG. 1 schematically shows a turbojet engine nacelle for an aircraft comprising a cascade thrust reverser according to the prior the art.

FIG. 1 shows a propulsion unit 1 comprising a nacelle 2 generally of tubular structure along a longitudinal axis X.

It further comprises a turbojet engine 3, for example of the bypass type, suitable for generating, via a rotating fan 4, a primary and secondary air flow.

The secondary air flow circulates outside the turbojet engine 3 through an annular flow path 5 formed between two walls of the nacelle 2.

The primary and secondary flow paths are ejected from the turbojet engine 3 by an ejection nozzle 6 located at the rear of the nacelle 2 and comprising more particularly a primary nozzle 61 configured to eject the primary flow path.

The ejection nozzle 6 further comprises a secondary nozzle 62 configured to eject the secondary flow path.

In order to reduce the braking distance of the aircraft during landing, the nacelle 2 comprises a mechanical cascade thrust reverser system 7.

More particularly, the role of the mechanical thrust reverser system is to redirect at least a portion of the thrust generated by the turbojet engine 3 towards the front of the nacelle 2, thus creating a counter-thrust.

For this purpose, cascades 8 are concealed in a movable cowl 9 configured to slide along rails from a closed position to an open position so as to uncover the cascades, which allows to redirect the secondary air flow towards the upstream of the nacelle 2.

Figure 2A:
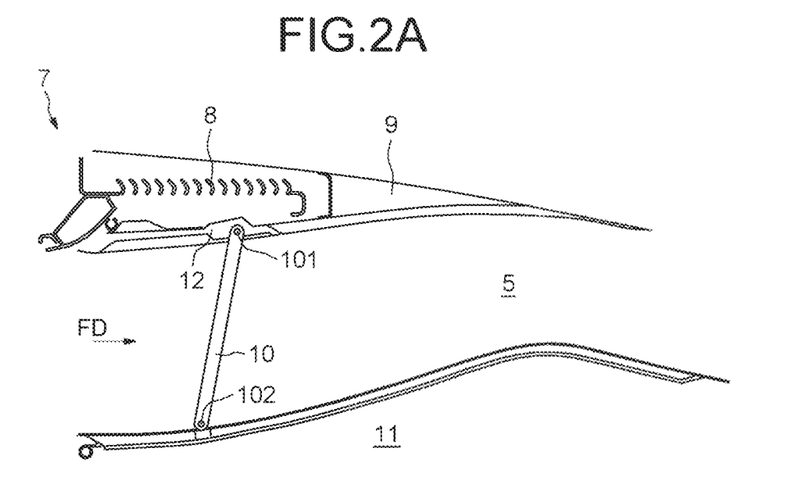
FIGS. 2A and 2B each illustrate a view according to an axial section of a cascade thrust reverser respectively in direct jet and reverse jet position according to the prior art.

The closed position is illustrated in FIG. 2A which shows the movable cowl 9 including a plurality of locking flaps 12 forming a joint with the sliding cowl 9.

A connecting rod 10 is pivotally mounted on the locking flap 12 and onto an inner fixed structure 11 commonly called IFS suitable for surrounding the rear portion of the turbojet engine 3.

The connecting rod 10 comprises a first joint 101 on the locking flap 12 as well as a second joint 102, corresponding to the connecting rod 10 small end, on the inner structure 11.

Thus, in this closed position, the secondary flow is able to circulate in the annular flow path 5 and generate with the primary flow a flow FD generating thrust.

Figure 2B:
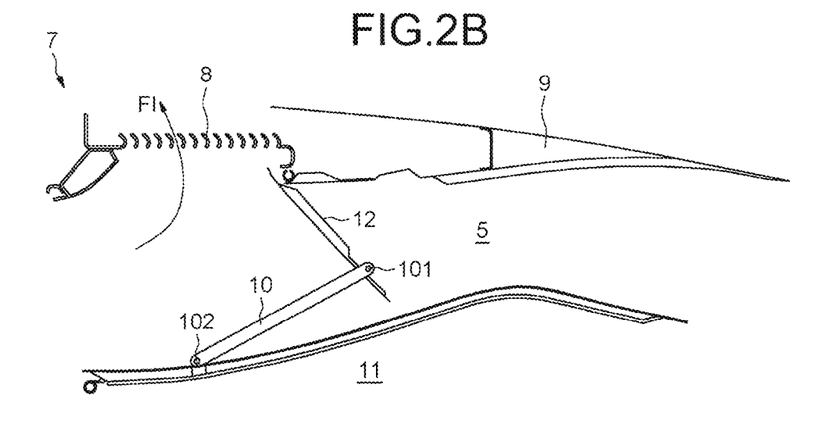

To generate a counter-thrust, an actuator such as a hydraulic cylinder not shown in FIG. 2B causes the cowl 9 to slide and causes the annular flow path 5 to be closed by the locking flaps 12.

This consequently leads to the redirection of the secondary flow into a reverse flow, here represented by the reference FI, through the cascades 8 to create the counter-thrust.

Figure 3A:
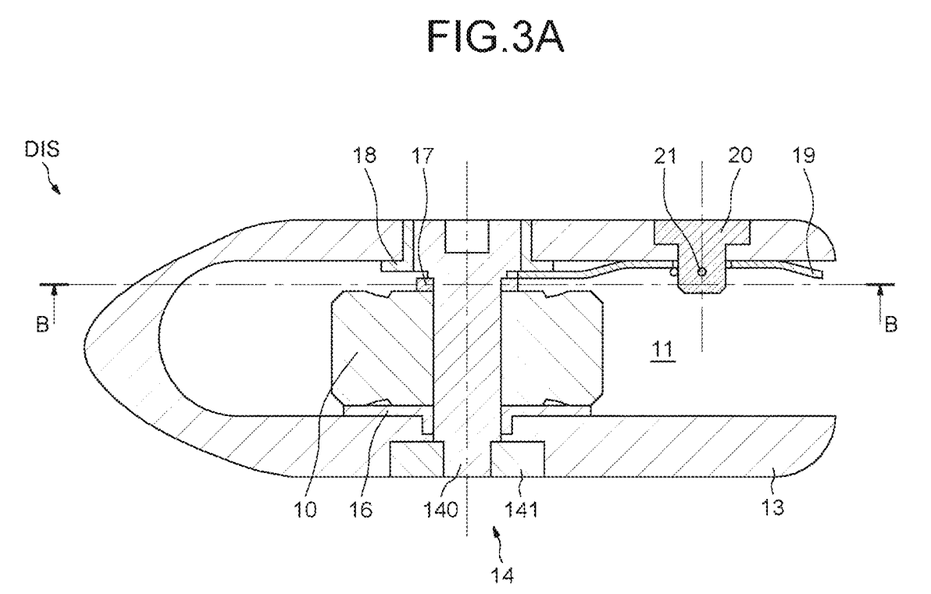
FIGS. 3A and 3B schematically illustrate a first embodiment of a device for attaching a connecting rod small end for a thrust reversal cascade flap.

To guarantee the correct operation of the connecting rod 10 and therefore of the reverser, it is advantageous to surround the connecting rod 10 small end by a fitting 13 as illustrated in FIG. 3A. This is a view of a section along the longitudinal axis X.

A device DIS for attaching the connecting rod 10 small end is located inside the space delimited by the fitting 13.

The device DIS includes a connection interface 14 forming a pivot connection for the connecting rod 10 small end and a removable fork 19 configured to partially surround the connection interface 14.

More particularly, the connection interface 14 comprises a first recessed or hexagonal socket screw 140 and a first nut 141 configured to cooperate with the first screw 140.

It is advantageous for the nut 141 to be of a shape configured to cooperate with the shape of the orifice of the fitting 13 into which it is inserted, so as to rotationally lock it.

The fork 19 therefore has the role of rotationally locking the first screw 140. It is also attached to the fitting 13 and locked in position by holding means comprising in this example a spring pin 21 surrounding a support area 20 integral with the fitting 13 and passing through the fork 19.

The device DIS for attaching the connecting rod 10 small end also comprises a first ring 16 arranged between the connecting rod 10 small end and the fitting 13, configured to take up, when the thrust reverser 7 is operational, the forces transmitted by the connecting rod 10 towards the fitting 13 through the first screw 140.

The first ring 16 is further used as a stopper for the connecting rod 10 to reduce any undesirable movement of the connecting rod 10, in particular angular oscillations.

A second ring 17 is also arranged between the connecting rod 10 and the fork 19. It allows, initially, to hold the fork 19 in position by holding it in position against a shouldered ring 18 at the fitting 13.

In a second step, the second ring 17 allows to lock the ball joint of the connecting rod 10 at the fitting 13 by means of the assembly comprising the at least one shoulder of the first screw 140, the first ring 16 and the nut 141.

The fork 13 therefore has a clearance with the second ring 17, the shouldered ring 18 and with the first screw 140.

Figure 3B:
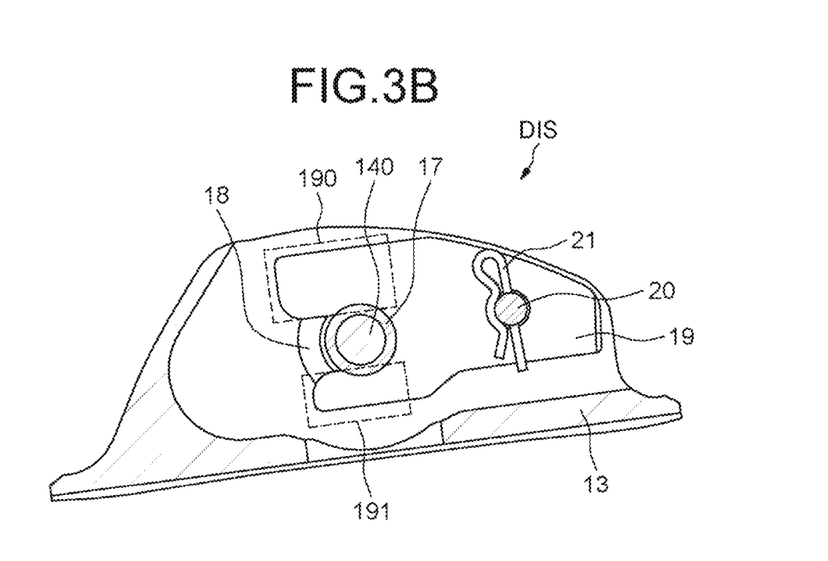

FIG. 3B illustrates an axial view along the axis B as defined in the previous figure.

The fork 19 includes a first tooth 190 and a second tooth 191 extending along a transverse axis perpendicular to the longitudinal axis of the first screw 140.

As for the first screw 140, it comprises in this example a shoulder in contact with its base and which is inserted between the first and the second tooth 190, 191, rotationally locking the first screw 140.

Figure 4:
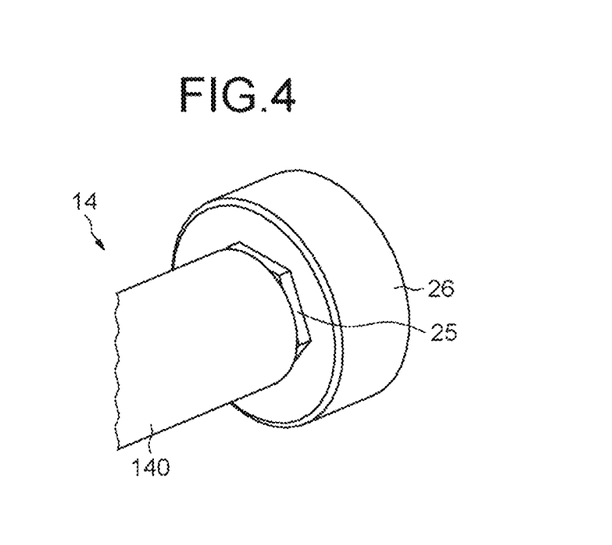
FIG. 4 illustrates a second embodiment of the attachment device.

Alternatively, as illustrated in FIG. 4, the first screw 140 comprises a plurality of flat surfaces 25 of hexagonal shape in contact with its base 26.

In this embodiment, the first screw 140 is, in the same way, inserted between the first and the second tooth 190, 191.

Figure 5A:
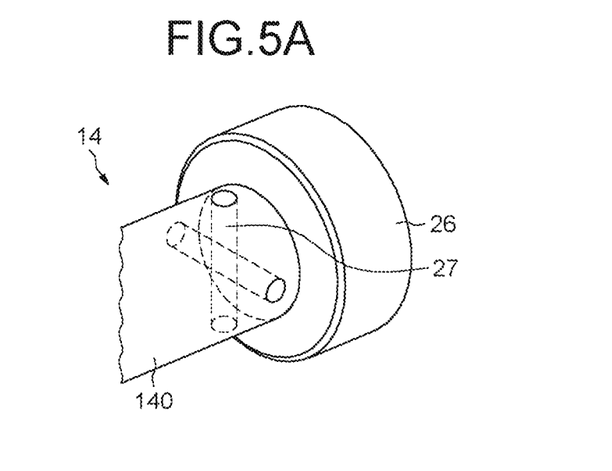
FIGS. 5A and 5B show perspective views of a third embodiment of the device for attaching the connecting rod small end.

Another variant is to insert in the first screw 140, as illustrated in FIGURE SA, at least one housing 27 of rounded shape which extends perpendicularly to the longitudinal axis of the screw 140.

Figure 5B:
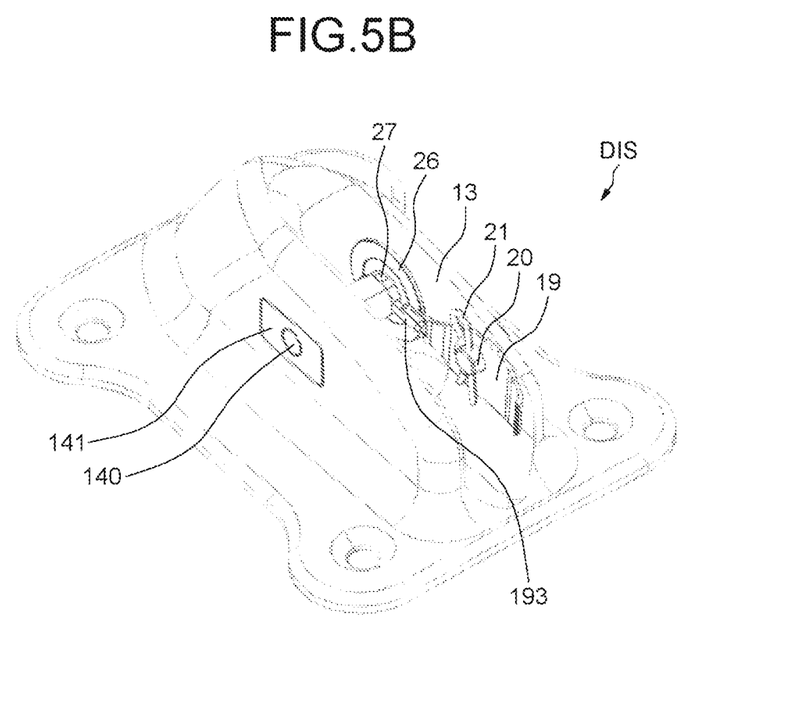

The fork 19 here comprises a single rod 193 which is inserted into the housing 27 to rotationally lock the first screw 140 as shown in FIG. 5B.

It should be noted that the housing 27 can be a through housing, which allows to double the number of positions wherein the rod 193 can be inserted into the housing 27.

Figure 6:
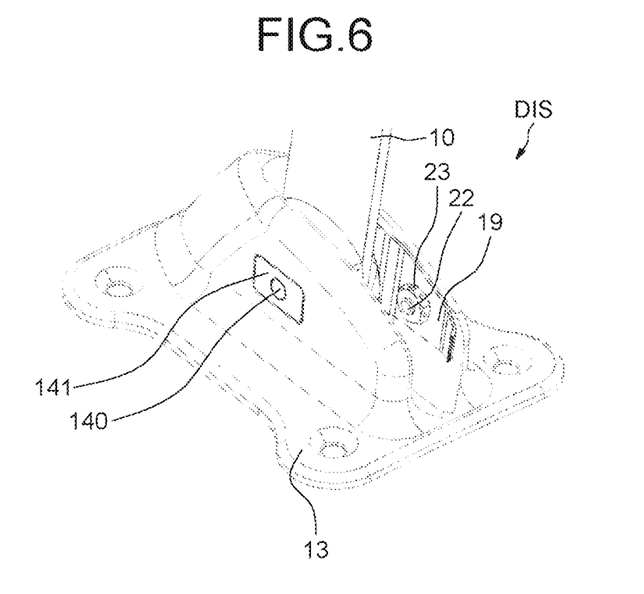
FIGS. 6 and 7 illustrate examples of means for holding a removable fork arranged inside the fixing device in accordance with the disclosure and, FIGS. 8A and 8B show an embodiment of the connecting rod small end and its arrangement in the device.

Moreover, as an alternative to the spring pin 21, mention can be made of a second screw 22 configured to cooperate with a second nut 23 as illustrated in FIG. 6.

Optionally, a lockwire can be placed between the second nut 23 and the fork 19 to improve the holding of the second screw 22.

Figure 7:
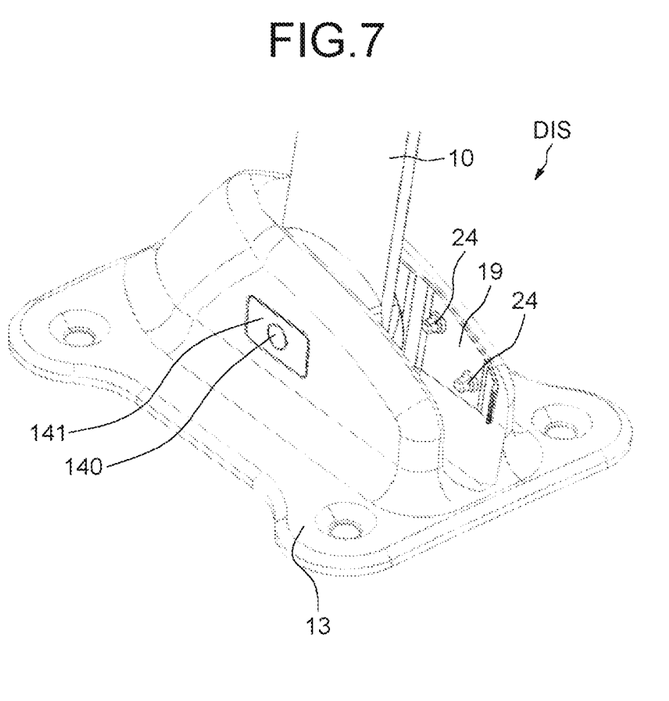

Another variant is to use rivets 24 as means for holding the fork 19 as illustrated in FIG. 7.

Figure 8A:
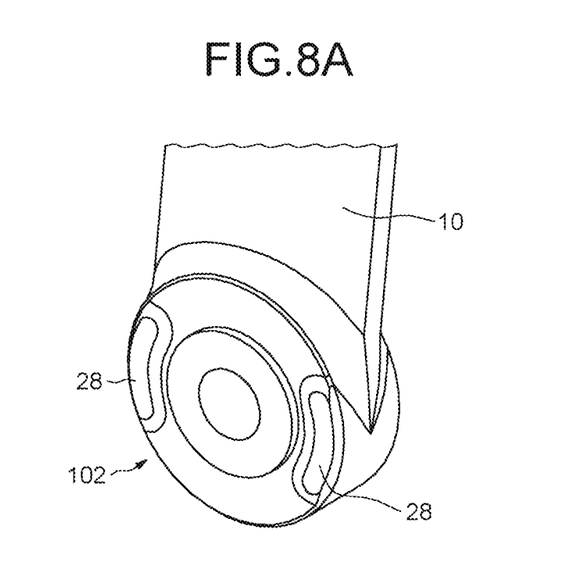

FIG. 8A illustrates an embodiment of the connecting rod 10 small end according to the disclosure.

The connecting rod 10 small end here includes at least two projections 28 perpendicular to the longitudinal axis of the connecting rod 10.

Figure 8B:
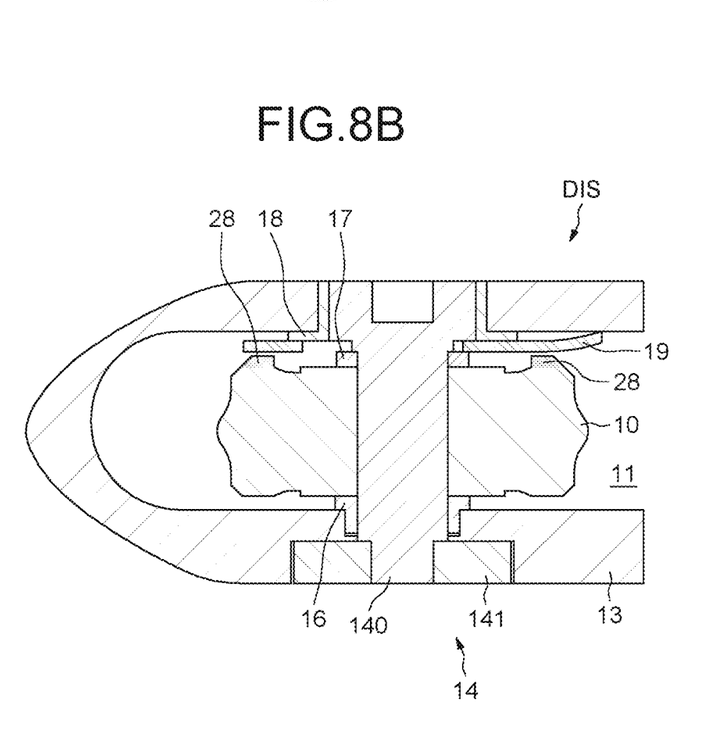

As illustrated in FIG. 8B which shows an axial view along the longitudinal axis X, by contacting the two projections 28 with the fork 19, the angular oscillations of the connecting rod 10 are reduced.

This also has the advantage of reducing the dimensions of other mechanical parts, in particular the width of the first ring 16. The width of the fitting 13 is therefore reduced while improving its aerodynamic profile.

The invention claimed is:

1. A device for attaching a connecting rod small end of a thrust reversal cascade flap onto an inner fixed structure of a turbojet engine nacelle, comprising a fitting configured to be fixed to said inner fixed structure and a connection interface forming a joint between the connecting rod small end and the fitting, and a removable locking means configured to cooperate with the connection interface so as to rotationally lock the connection means interface, the locking means and the connection interface being arranged inside the fitting.

2. The device according to claim 1, wherein the connection interface comprises a first screw and a first nut configured to cooperate with said first screw.

3. The device according to claim 2, wherein the first screw comprises at least one flat surface or at least one shoulder in contact with a base, the removable locking means comprising a fork including at least one tooth extending along a transverse axis perpendicular to a longitudinal axis of the first screw, said at least one tooth cooperating with said at least one flat surface or shoulder.

4. The device according to claim 2, wherein the first screw comprises at least one housing extending perpendicularly to a longitudinal axis of the first screw, and wherein the removable locking means includes a fork comprising a rod configured to be inserted into said at least one housing.

5. The device according to claim 1, further comprising holding means arranged inside the fitting and configured to hold the locking means in position.

6. The device according to claim 5, wherein the holding means comprise a spring pin surrounding a support area integral with the fitting and passing through the locking means.

7. The device according to claim 5, wherein the holding means comprise at least one rivet located on the locking means.

8. The device according to claim 5, wherein the holding means comprise a second screw configured to cooperate with a second nut.

9. The device according to claim 8, wherein the holding means comprise a lockwire arranged between the second nut and the locking means, configured to hold the second screw in position.

10. The device according to claim 5, wherein the holding means are at a distance comprised between 12 mm and 200 mm from the connection interface.

11. The device according to claim 1, wherein the connecting rod small end comprises at least two projections perpendicular to the longitudinal axis of the connecting rod and in contact with the locking means.

12. A cascade thrust reverser comprising the device according to claim 1.

13. A nacelle for an aircraft turbojet engine, including the cascade thrust reverser according to claim 12.

* * * * *